United States Patent [19]

Coquelet et al.

[11] 3,986,678

[45] Oct. 19, 1976

[54] CENTRIFUGAL BRAKE FOR A FISHING REEL

[75] Inventors: André Coquelet; Jean-Paul Lemery, both of Cluses, France

[73] Assignee: Garcia Corporation, Teaneck, N.J.

[22] Filed: Oct. 16, 1974

[21] Appl. No.: 515,085

[30] Foreign Application Priority Data

Nov. 8, 1973 France .............................. 73.39773

[52] U.S. Cl. .......................... 242/84.52 C; 188/185
[51] Int. Cl.² ......................................... A01K 89/02
[58] Field of Search ...................... 242/84.52 C, 99; 188/185

[56] References Cited
UNITED STATES PATENTS 3,111,287  11/1963  Baenziger ................ 242/84.52 C X Primary Examiner—Billy S. Taylor
Attorney, Agent, or Firm—Fitzpatrick, Cella, Harper & Scinto

[57] ABSTRACT

A fishing reel with a removable rotatable spool has a centrifugal brake including a fixed cylindrical brake drum. Radial grooves in a lateral face of the spool, or in a casing removably fixed on a lateral face of the spool, house brake blocks, balls or rollers which when the spool rotates move radially outwards and coact with the brake drum. The brake blocks can be interchanged to vary the braking force by removal and insertion thereof through lateral openings of the grooves. These openings are normally obturated by a cover held against said lateral face of the spool, but can be uncovered by twisting the cover after the spool has been removed from the reel.

7 Claims, 5 Drawing Figures

CENTRIFUGAL BRAKE FOR A FISHING REEL

The present invention concerns centrifugal brakes for fishing reels of the type including a spool turning about an axis perpendicular to the fishing rod. Such a spool may either be rotatable with its shaft, or rotatable about a fixed shaft. Such brakes include inertia-blocks able to move radially relative to the rotating spool, under the action of centrifugal force, to come to bear against an inner cylindrical face of a brake drum which is fixed in relation to the spool.

In some known brakes of this type, the inertia-blocks are each supported by a pin disposed radially to the spool; these inertia-block pins are generally fixed on a rotating shaft of the spool. However, the provision of such inertia-block pins is delicate; moreover, if an increase of the braking force is desired, it is necessary to multiply the number of inertia-block pins which necessitates the use, as in French Pat. No. 2,144,765, of an additional intermediate ring on which the inertia-block pins are fixed, this intermediate ring itself being fixed on the spool shaft. Also, if the angler wishes to change the spool of his reel during fishing, nothing is provided to hold the inertia-blocks on their pins and avoid loss thereof.

An aim of the invention is to provide a centrifugal brake which avoids the above-indicated drawbacks and allows changing the inertia-operated brake blocks to take into account the type of fishing or the line used.

According to the invention there is provided in a fishing reel including a rotatable spool, a centrifugal brake comprising a fixed brake drum having an inner cylindrical braking surface coaxial with the spool, a part rotatable with the spool and disposed within the brake drum, a plurality of radially-disposed housings in said part, brake blocks radially slidably mounted in said housings and able to move into contact with the braking surface in response to rotation of the spool, each housing having a lateral opening on a lateral face of the spool to permit a brake block to be inserted in and removed from the housing, and at least one cover able to obturate said lateral openings of the housings.

Preferably, each of said housings has at an extremity thereof facing said brakes surface, an end opening which is smaller than the cross-section of the remainder of the housing, and each brake block has a narrowed extremity able to pass through said end opening. For example, the brake blocks may be balls, or rollers received in the housing with the axes of the rollers parallel to the axis of the spool.

Said part including the housings may be a casing removably fixed to the spool.

In a preferred embodiment, a single cover is held axially against said lateral face of the spool and normally rotates with the spool, said cover being rotatable relative to the spool about the spool axis between a first position covering said lateral openings and a second position uncovering said lateral opening.

This preferred embodiment preferably further comprises means for locking the cover in its first, closed position, these locking means comprising means for biasing the cover toward said lateral face of the spool, and protruding parts of the cover engageable in said lateral openings under the action of said biasing means to prevent rotation of the cover relative to the spool.

The accompanying drawings show, by way of example, several embodiments of brakes according to to the invention. In the drawings.

Figure 1:
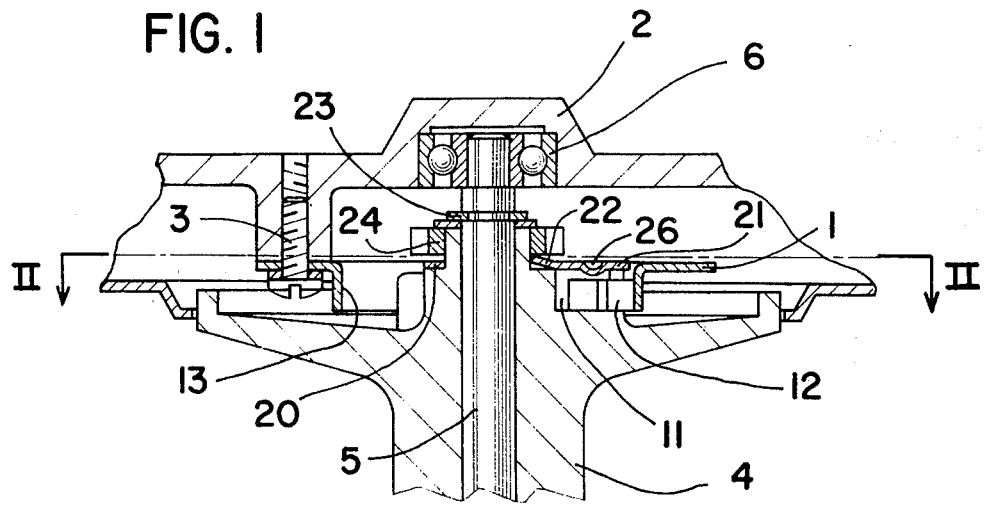
FIG. 1 is a cross-section, taken along line I—I of FIG. 2, of a first embodiment of a brake with its cover in a closed position.
Figure 2:
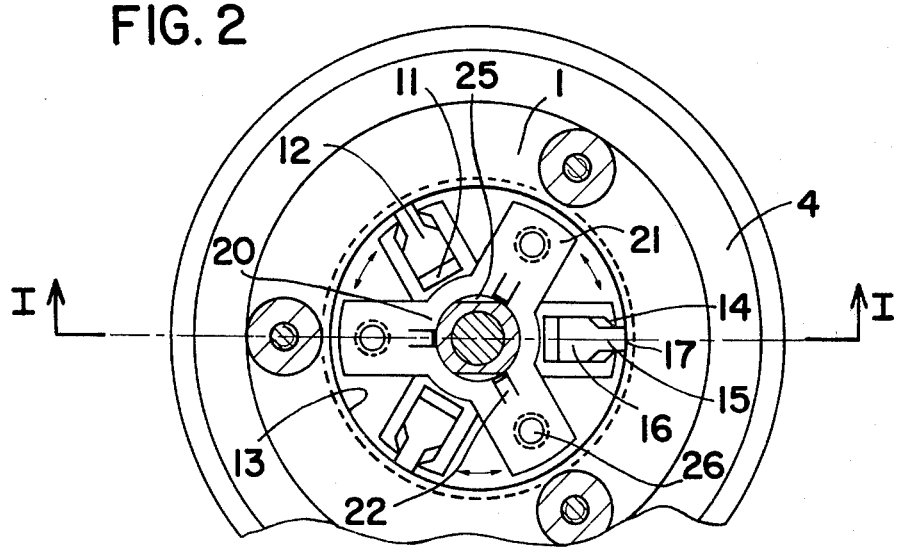
FIG. 2 is a cross-section, taken along line II—II of FIG. 1, showing the same embodiment of brake with its cover in an open position.

The centrifugal brake shown in FIGS. 1 and 2 includes a brake drum 1, fixed to a side-plate 2 of a fishing reel by screws 3. A line spool 4 of the fishing reel is fixed on a shaft 5 rotatably and removably mounted between two side-plates 2, only one of which is shown here, by means of ball bearings 6 at each end of the shaft. In one lateral flange of spool 4 are provided three radial grooves 11 receiving, with a sufficient play to be able to freely slide, three respective inertia blocks 12. The ends of these grooves furthest removed from the shaft 5 are disposed immediately facing an inner cylindrical surface 13 of the brake drum 1. Each of these outer ends of the grooves includes a tapered opening 14 whose narrow end is smaller than the cross-section of the remainder of the groove. The inertia blocks 12 have a corresponding shape, and include a narrow part 15 able to pass freely through each opening 14, and a wider part 16 slidable in the groove and unable to pass through opening 14. The end 17 of the narrow part of each inertia block is able to come into contact with the surface 13 of brake drum 1 before the wider part 16 of the inertia block abuts against the tapered part of the groove.

To prevent the inertia blocks from leaving their housings when the spool is dismantled from the fishing reel, a cover 20 is disposed facing the lateral flange of the spool. This cover 20 has three radial arms 21 each able to cover groove 11. It is elastically held on the spool by means of three resilient tabs 22 which bias cover 20 towards the lateral flange of the spool by acting against a ring clip 23 placed in a groove of shaft 5. As shown, a spacer 24, advantageously formed as a ratchet, is preferably placed between the cover 20 and the clip 23, this ratchet being keyed on two flats 25 of the shaft. Each arm 21 includes an inwardly-protruding part or dent 26 which faces and is engaged in a groove 11 when the cover 20 is closed, as shown in FIG. 1, which is the normal position for fishing.

During fishing, at the moment of casting, the spool 4 is rotated at high speed as the fishing line is drawn out by the lure and the weight disposed at the end of the line. At this moment, the inertia blocks 12, by centrifugal action, each slide in their groove 11 and their ends 17 come to rub against the inner cylindrical surface 13 of the brake drum 1, thus acting as brake blocks to brake and govern the spool 4.

According to the type of fishing and the line used, the required braking force varies, and to vary the braking force the angler uses inertia blocks 12 of different masses and different material. To change the inertia-blocks, the angler removes the spool 4 from the reel; there is no risk of losing the inertia blocks 12 which are housed in grooves 11 closed by cover 20. He then turns the cover 20 by a sixth of a turn in either direction, the elasticity of tabs 22 enabling the dents 26 to move out of the grooves 11, which are thus uncovered (FIG. 2) After changing the inertia blocks 12, the cover 20 is turned back to its initial closed position, and the spool 4 replaced in the reel.

The described first embodiment is particularly suited for incorporation of a spool of low inertia, for example of moulded synthetic plastic material.

Figure 4:
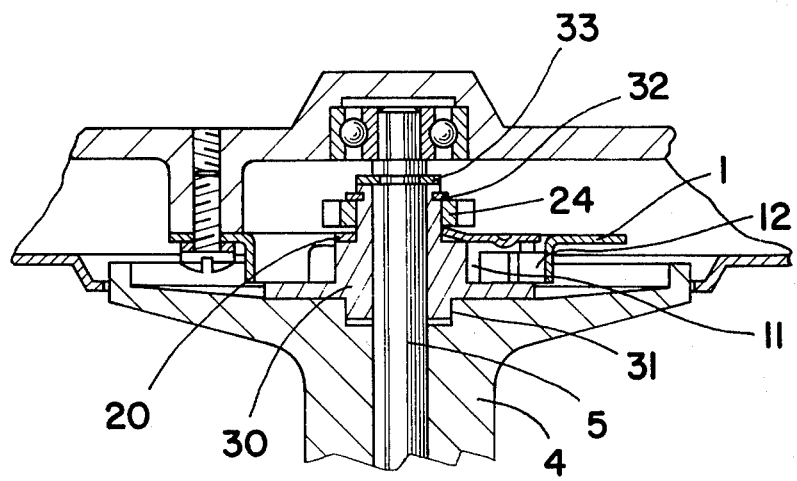
FIG. 4 is an axial cross-section of a second embodiment of brake.

In the second embodiment shown in FIG. 4, particularly suitable for a metal spool 4, an intermediate casing 30, for example of moulded synthetic plastic material to reduce the inertia thereof, is keyed on spool 4 by two flats 31. Casing 30 is provided with radial grooves 11 and houses corresponding inertia blocks 12, cover 20 being held thereupon by a spacer 24 and a clip 32 placed in a circular groove provided at an end of a sleeve forming part of casing 30. The casing 30 is held against the lateral face of spool 4 by a clip 33 placed in a groove of shaft 5. The other elements are identical to those of the first embodiment, and the operation of the brake is identical. An advantage of this embodiment is that the entire casing 30, equipped with inertia blocks and a cover, may possible be changed when it is desired to change the inertia blocks.

Figure 5:
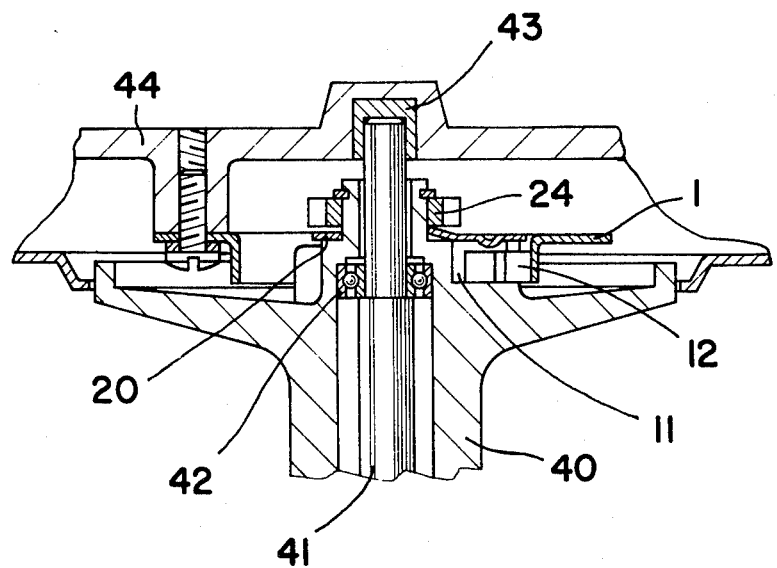
FIG. 5 is an axial cross-section of a third embodiment of brake.

The two previously described embodiments concern a spool which rotates with its shaft; however, the invention also applies to fishing reels in which a spool is free to rotate about a fixed shaft. Such an arrangement is shown in FIG. 5 wherein a spool 40 is pivoted on a shaft 41 by the intermediary of ball bearings 42, the shaft 41 being itself secured at its ends in housings 43 in side plates 44. All the other elements of the brake are identical to these of the first embodiment, and operation of the brake is identical.

Figure 3:
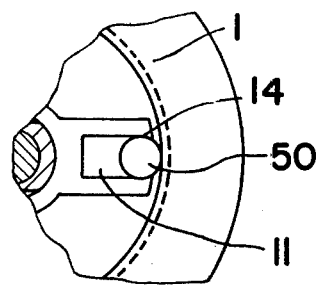
FIG. 3 is a partial view of a variation applicable to all of the embodiments of a brake according to the present invention.

FIG. 3 shows a variation of any of the preceding embodiments, in which each inertia block is formed by a rolling member 50, either a ball, or a roller whose longitudinal axis is parallel to that of the spool. In either case, the friction previously obtained by sliding of the inertia block 12 against the brake drum 1 is replaced by a friction provided by rolling of member 50 against the brake drum 1. It is observed that each opening 14 may be of such a shape that it interchangeably receives an inertia-block 12 as shown in FIGS. 1, 2, 4 and 5 or a ball or roller 50 as shown in FIG. 3.

The centrifugal brake according to the invention is particularly intended for fishing reels having a rotatable spool whose axis is disposed perpendicular to the rod, in which it is required to control the speed of rotation of the spool.

What is claimed is:

1. In a fishing reel including a rotatable spool, and a centrifugal brake comprising a fixed brake drum having an inner cylindrical braking surface coaxial with the spool, a part rotatable with the spool and disposed within the brake drum, a plurality of radially-disposed housings in said part, and brake blocks radially slidably mounted in said housings and able to move into contact with the braking surface in response to rotation of the spool, the improvement which comprises; each of said housings being defined between an opposed pair of smooth walls in said part which extend radially and axially of said spool, said brake blocks disposed within said housings having opposed smooth walls adjacent the pairs of smooth walls defining said housings and being dimensioned to fit within said housings freely slidable axially and radially of said spool, each housing having a lateral opening on a lateral face of the spool to permit a brake block to be inserted in and removed from the housing through the lateral opening axially of the spool, and at least one cover positionable to obturate said lateral openings of the housings to retain said brake blocks within said housings.

2. A brake according to claim 1, in which each of said housings has at an extremity thereof facing said braking surface an end opening which is smaller than the cross-section of the remainder of the housing, each brake block having a narrowed extremity able to pass through said end opening.

3. A brake according to claim 2, in which the brake blocks are balls.

4. A brake according to claim 2, in which the brake blocks are rollers, each roller being received in a housing with the axis of the roller generally parallel to the axis of the spool.

5. A brake according to claim 2, in which said part is a casing removably fixed to the spook, and further comprising means for removably fixing the casing to the spool.

6. A brake according to claim 1, comprising a single cover, and means for axially holding the single cover against said laterial face of the spool and normally rotating with the spool, said means for axially holding the single cover comprising means for rotatably mounting the cover to be rotatable relative to the spool about the spool axis between a first position covering said lateral openings and a second position uncovering said lateral openings.

7. A brake according to claim 6, comprising means for locking the cover in said first position, said locking means comprising means for biasing the cover toward said lateral face of the spool, and protruding parts of the cover engageable in said lateral openings under the action of said biasing means to prevent rotation of the cover relative to the spool.

* * * * *

UNITED STATES PATENT OFFICE
CERTIFICATE OF CORRECTION

Patent No. 3,986,678          Dated   October 19, 1976

Inventor(s)   ANDREA COQUELET et al.

It is certified that error appears in the above-identified patent and that said Letters Patent are hereby corrected as shown below:

Claim 5, line 2, "spook" should be --spool--.

Signed and Sealed this

Fourteenth Day of December 1976

[SEAL]

Attest:

RUTH C. MASON
*Attesting Officer*

C. MARSHALL DANN
*Commissioner of Patents and Trademarks*